US007329312B2

United States Patent
Morita et al.

(10) Patent No.: US 7,329,312 B2
(45) Date of Patent: Feb. 12, 2008

(54) APPARATUS FOR SUPPLYING WATER CONTAINING DISSOLVED GAS

(75) Inventors: Hiroshi Morita, Hadano (JP); Junichi Ida, Koga (JP); Kazumi Tsukamoto, Sendai (JP)

(73) Assignee: Kurita Water Industries, Ltd., Tokyo (JP)

( * ) Notice: Subject to any disclaimer, the term of this patent is extended or adjusted under 35 U.S.C. 154(b) by 0 days.

(21) Appl. No.: 11/653,664

(22) Filed: Jan. 16, 2007

(65) Prior Publication Data

US 2007/0114682 A1    May 24, 2007

Related U.S. Application Data

(62) Division of application No. 10/507,539, filed as application No. PCT/JP03/03289 on Mar. 18, 2003, now abandoned.

(30) Foreign Application Priority Data

May 16, 2002    (JP)    ............................. 2002-142032

(51) Int. Cl.
*B01D 19/00*    (2006.01)
*B01F 1/00*    (2006.01)
*C02F 1/20*    (2006.01)

(52) U.S. Cl. ..................... 96/6; 96/156; 96/202; 95/1; 95/46; 95/241; 261/122.1; 261/121.1

(58) Field of Classification Search ............ 261/122.1, 261/121.1; 95/1, 46, 241; 96/6, 156, 202
See application file for complete search history.

(56) References Cited

U.S. PATENT DOCUMENTS

| 4,595,498 A | 6/1986 | Cohen et al. |
| 5,800,626 A | 9/1998 | Cohen et al. |

FOREIGN PATENT DOCUMENTS

JP    08-281281 A    10/1996

(Continued)

OTHER PUBLICATIONS

JPO machine translation of JP 2000-271549 description of drawings and detailed description pp. 1-8.*

(Continued)

*Primary Examiner*—Duane Smith
*Assistant Examiner*—Douglas J. Theisen
(74) *Attorney, Agent, or Firm*—Frishauf, Holtz, Goodman & Chick, P.C.

(57) ABSTRACT

An apparatus for supplying water containing dissolved gas comprising a flowmeter for measuring a flowrate of pure or ultra-pure water and a mechanism for controlling a flowrate, a means for adjusting an amount of water which adjusts an amount of the pure or ultra-pure water supplied to the apparatus for dissolving a gas, a tank which receives the water containing dissolved gas in an excessive amount which is not used at a point of use, a piping system through which the water containing dissolved gas glows from the tank towards the point of use and the water containing dissolved gas in an excessive amount returns to the tank, a piping system for supplying the water containing dissolved gas to the tank, and a controlling means for adjusting an amount of water based on a water level in the tank.

18 Claims, 2 Drawing Sheets

FOREIGN PATENT DOCUMENTS

| | | | |
|---|---|---|---|
| JP | 9-501017 A | | 1/1997 |
| JP | 09-232270 A | | 9/1997 |
| JP | 09-232273 A | | 9/1997 |
| JP | 10-154683 A | | 6/1998 |
| JP | 10-154685 A | | 6/1998 |
| JP | 10-202242 A | | 8/1998 |
| JP | 10-242107 A | | 9/1998 |
| JP | 11-077021 A | | 3/1999 |
| JP | 11-077023 A | | 3/1999 |
| JP | 11-121417 A | | 4/1999 |
| JP | 11-138182 | * | 5/1999 |
| JP | 11-138182 A | | 5/1999 |
| JP | 11-333475 A | | 12/1999 |
| JP | 3029608 B1 | | 2/2000 |
| JP | 2000-153139 A | | 6/2000 |
| JP | 2000-216130 | * | 8/2000 |
| JP | 2000-216130 A | | 8/2000 |
| JP | 2000-271549 | * | 10/2000 |
| JP | 2000-271549 A | | 10/2000 |
| JP | 3117427 B2 | | 10/2000 |
| JP | 2001-025715 A | | 1/2001 |
| JP | 2001-79376 A | | 3/2001 |
| JP | 2001-085304 A | | 3/2001 |
| JP | 2001-286833 A | | 10/2001 |
| WO | WO 95/02895 A1 | | 1/1995 |

OTHER PUBLICATIONS

JPO machine translation of JP 2000-216130 description of drawings and detailed description pp. 1-9.*
JPO machine translation of JP 11-138182 description of drawings and detailed description pp. 1-6.*
JPO machine translation of JP 2000-271549, Oct. 2000, description of drawings and detailed description pp. 1-8.*
JPO machine translation of JP 2000-216130, Aug. 2000, description of drawings and detailed description pp. 1-9.*
JPO machine translation of JP 11-138182, May 1999, description of drawings and detailed description pp. 1-6.*

* cited by examiner

APPARATUS FOR SUPPLYING WATER CONTAINING DISSOLVED GAS

CROSS-REFERENCE TO RELATED APPLICATIONS

This application is a divisional application of Ser. No. 10/507,539 filed Sep. 13, 2004, now abandoned which is the United States national phase application under 35 USC 371 of International Application PCT/JP03/03289 filed Mar. 18, 2003.

TECHNICAL FIELD

The present invention relates to an apparatus for continuous dissolution and a process for continuous dissolution. More particularly, the present invention relates to an apparatus for continuous dissolution and a process for continuous dissolution which can supply, without loss, cleaning water or surface treatment water used for electronic materials which particularly requires a precisely dean surface and to an apparatus for supplying water for cleaning containing a dissolved gas which is equipped with the apparatus for continuous dissolution.

BACKGROUND ART

In the wet cleaning process for electronic materials, the so-called functional water for cleaning which is prepared by dissolving a minute amount of a specific gas or a specific chemical into ultra-pure water has been recognized to be useful and is being used more widely. Apparatus using a module having a built-in gas-permeating membrane in the portion for dissolution or in the portion for degassing and dissolution are widely used. These apparatuses are useful since the entire amount of the gas to be supplied can be dissolved as long as the concentration does not exceed the concentration of saturation when the main stream liquid is preliminarily treated by degassing.

However, an apparatus for dissolving a specific gas such as hydrogen or a specific gas and a specific chemical can provide a functional water containing the gas or the chemical in the prescribed concentration only when the main stream liquid is supplied at a constant flow rate. When the amount of supply of the main stream liquid changes due to some outside factors or due to saving of water, a problem arises in the practical operation that the concentration of the gas or the chemical in the produced functional water fluctuates.

During the period of time when the functional water is not used, occasionally, a small amount of the main stream liquid alone is continuously supplied without supplying the specific gas. This causes another problem in the practical operation in that, at the start of the period of time when the functional water is used, it takes a considerable time until the concentration of the dissolved gas reaches the prescribed value and is stabilized at this value after the start of the supply of the specific gas.

To stabilize the concentration of the dissolved gas, a feed back mechanism in which an output signal is received from the portion for measurement of the concentration placed at the down stream side of the dissolution apparatus and the amount of supply of the gas to be dissolved is controlled, is widely used. However, the desirable results cannot be obtained even when this mechanism is applied to preparation of the functional water. The reason is that a functional water having an undesired concentration is prepared at least during the period of time lag by the feed back and the hunting phenomenon in the concentration cannot be prevented even when the so-called PID control is conducted.

Therefore, an apparatus for continuous dissolution and a process for continuous dissolution which can maintain the quality of the functional water, i.e., the condition in which the concentrations of the gas and the chemical can be kept stable, even when the flow rate of the main stream water changes, has been desired.

The present invention has an object of providing an apparatus for continuous dissolution and a process for continuous dissolution which provides a solution having a constant concentration with stability even when the flow rate of the main stream liquid changes and can supply cleaning water or surface treatment water used for electronic materials which particularly requires a precisely clean surface without loss.

The present invention has another object of providing an apparatus for supplying water containing a dissolved gas which utilizes the apparatus for continuous dissolution providing a solution having a constant concentration with stability.

DISCLOSURE OF THE INVENTION

As the result of the intensive studies by the present inventors to overcome the above problems, it was found that a functional water having a constant concentration of a gas and a chemical could be produced with stability, even when the flow rate of the main stream liquid changed, by disposing a flow meter which measured the flow rate of the main stream liquid and output the signal of the value obtained by the measurement and a mechanism for controlling the flow rate which controlled the amount of supply of the gas or the amounts of supply of the gas and the other chemical based on the signal input from the flow meter. The present invention has been completed based on the above knowledge.

The present invention provides:

(1) An apparatus for continuous dissolution which comprises a dissolution portion for dissolving a gas into a main stream liquid, the apparatus further comprising a flow meter which measures a flow rate of the main stream liquid and outputs a signal of a value obtained by the measurement, a mechanism for controlling a flow rate which controls an amount of supply of the gas based on the signal input from the flow meter and an apparatus for degassing the main stream liquid which is disposed at a position at an upstream of the dissolution portion for dissolving a gas;

(2) An apparatus for continuous dissolution as described in (1), wherein the main stream liquid is pure water or ultra-pure water;

(3) An apparatus for continuous dissolution as described in (2), which comprises a means for injecting an other liquid into the main stream liquid and controls an amount of addition of the other liquid based on the signal;

(4) A process for continuous dissolution which comprises continuously dissolving a gas or a gas and an other liquid into a main stream liquid, wherein the main stream liquid is degassed before the gas is dissolved and an amount of supply of the gas or amounts of supply of the gas and the other liquid are controlled based on a flow rate of the main stream liquid before the degassing or after the degassing;

(5) An apparatus for supplying water containing a dissolved gas which comprises:
   a portion for producing the water containing a dissolved gas comprising:

an apparatus for dissolving a gas which comprises a flow meter measuring a flow rate of pure water or ultra-pure water and outputting a signal of a value obtained by the measurement and a mechanism for controlling a flow rate which controls an amount of a gas to be dissolved into the pure water or the ultra-pure water based on the signal input from the flow meter, and a means for adjusting an amount of water which adjusts an amount of the pure water or the ultra-pure water supplied to the apparatus for dissolving a gas, and a portion for supplying the water containing a dissolved gas comprising:

a water tank which receives the water containing a dissolved gas in an excess amount which is not used at a point of use, a piping system through which the water containing a dissolved gas flows from the water tank towards the point of use and the water containing a dissolved gas in an excess amount returns to the water tank, and a piping for supplying the water containing a dissolved gas which supplies the water containing a dissolved gas obtained in the portion for producing the water containing a dissolved gas to the water tank; and controls the means for adjusting an amount of water based on a water level in the water tank; and (6) An apparatus for supplying water containing a dissolved gas described in (5), wherein the water tank is a water tank of a sealed type equipped with a portion for supplying a sealing gas and the sealing gas is a same gas as the gas dissolved in the water containing a dissolved gas.

As the preferable embodiments, the present invention further provides:

(7) An apparatus for continuous dissolution as described in (1), wherein the flow rate of the gas is controlled in accordance with the proportional control or the PID control;

(8) An apparatus for continuous dissolution as described in (1), wherein the dissolution portion comprises a module comprising a built-in gas-permeating membrane;

(9) An apparatus for continuous dissolution as described in (1), wherein the apparatus for degassing comprises a module comprising a built-in gas-permeating membrane;

(10) An apparatus for continuous dissolution as described in (1), which comprises a mechanism for controlling the flow rate comprising a mass flow controller;

(11) An apparatus for continuous dissolution as described in (1), wherein the gas is hydrogen, oxygen, nitrogen, helium, argon, ozone, ammonia, carbon dioxide or a mixture of these gases;

(12) An apparatus for continuous dissolution as described in (3), wherein a piping for transporting the main stream liquid has a portion for adding the other liquid which is disposed at a stage before a means for mixing.

(13) An apparatus for continuous dissolution as described in (3), which comprises a mechanism for controlling the flow rate comprising a pump for injecting a chemical which can change the flow rate.

(14) An apparatus for continuous dissolution as described in (3), wherein the other liquid is ammonia, sodium hydroxide, potassium hydroxide, tetramethylammonium hydroxide, hydrochloric acid, sulfuric acid, nitric acid, hydrofluoric acid, phosphoric acid, acetic acid, oxalic acid, a solution containing hydrogen peroxide or a mixture of these liquids; and (15) An apparatus for continuous dissolution as described in (4), wherein the flow rate of the gas is controlled in accordance with the proportional control or the PID control

BRIEF DESCRIPTION OF THE DRAWINGS

In the Figures, reference number 6 means an injection portion, reference number 7 means a membrane apparatus for degassing, reference number 8 means a flow meter, reference number 9 means a mass flow controller, reference number 10 means a hydrogen gas generator, reference number 11 means a membrane module for dissolution of a gas, reference number 13 means a tank for aqueous ammonia, reference number 14 means a chemical-injection pump, reference number 15 means an inline mixer, reference number 16 means a concentration monitor for dissolved hydrogen, reference number 17 means a pH meter, reference number 19 means a valve, reference number 21 means a water tank, reference number 22 and reference number 22' mean pipings, reference number 23 means a pump, reference number 24 means a filter, reference number 25 means a water level meter, reference number 26 means a piping for supplying a sealing gas, reference number 28 means a piping for supplying gas-dissolved water and reference number 30 means a cover.

THE MOST PREFERRED EMBODIMENT TO CARRY OUT THE INVENTION

The apparatus for continuous dissolution of the present invention comprises a dissolution portion for dissolving a gas into a main stream liquid, wherein the apparatus further comprises a flow meter which measures the flow rate of the main stream liquid and outputs a signal of a value obtained by the measurement and a mechanism for controlling the flow rate which controls the amount of supply of the gas based on the signal input from the flow meter. The process for continuous dissolution of the present invention comprises continuously dissolving a gas or a gas and an other liquid into a main stream liquid, wherein the amount of the gas or the amounts of the gas and the other liquid are controlled based on the flow rate of the main stream liquid.

The apparatus and the process of the present invention can be advantageously applied to the production of the functional water which is an aqueous solution dissolving a gas or a combination of a gas and an alkali or an acid into pure water or ultra-pure water as the main stream liquid. In the present invention, pure water means water having a high purity which can be regarded to be almost the same as pure water from which impurities have been removed as much as possible. Ultra-pure water means water having an extremely high purity from which substances suspended or dissolved in water have been removed extremely so that the concentration of the dissolved substances is at the level of 1 µg/liter. The aqueous solution obtained by dissolving a gas into the pure water or the ultra-pure water or the functional water obtained by dissolving a gas and an aqueous solution comprising a dissolved alkali or acid into the pure water or the ultra-pure water can be advantageously used as cleaning water and surface treatment water for electronic materials such as substrates of semiconductors, substrates of liquid crystal displays, substrates of photomasks and substrates of hard disks.

In the present invention, it is preferable that the amount of supply of the gas is controlled in accordance with the proportional control or the PID control. By the proportional control or the PID control of the amount of supply of the gas in accordance with the change in the flow rate of the main stream liquid, the functional water into which the gas is dissolved in a constant concentration can be constantly produced.

The flow meter used for measuring the flow rate of the main stream liquid in the present invention is not particularly limited. Examples of the flow meter include flow meters of the restricted flow type such as the orifice flow meter and the Venturi flow meter; flow meters of the liquid resistance type such as the resistance flow meter, the flow meter of the area type and the flow meter of the laminar flow type; flow meters of the liquid vibration type such as the Karman's vortex flow meter, the swirl flow meter and the fluidic flow meter; flow meters of the volume type; flow meters of the blade wheel type; flow meters of the water blow type; flow meters of the electromagnetic type; and flow meters of the ultrasonic type. Among these flow meters, Karman's vortex flow meter and the flow meter of the ultrasonic type having no sliding portions are preferable since contamination of water can be prevented. In the present invention, the flow rate of the main stream liquid is measured by the above flow meter and the amount of supply of the gas or the amounts of supply of the gas and the other liquid are controlled based on the output signal of the value obtained by the measurement.

In the present invention, when the gas is dissolved into the main stream liquid (the pure water or the ultra-pure water), it is preferable that the supplied gas is completely dissolved into the supplied pure water or ultra-pure water. To completely dissolve the supplied gas into the pure water or the ultra-pure water, it is necessary that the main stream liquid is degassed in advance. By degassing the main stream liquid in advance, ideally, various gases dissolved in the main stream liquid (the pure water or the ultra-pure water) are removed and the gas dissolution capacity for the desired gas increases. In the main stream liquid (the pure water or the ultra-pure water) in the above condition, it is possible that the supplied gas is completely dissolved when the gas dissolution capacity is greater than the amount of the supplied desired gas. On the contrary, when various gases are left remaining in the main stream liquid (the pure water or the ultra-pure water) before the desired gas is dissolved, the capacity to dissolve a gas into the main stream liquid (the pure water or the ultra-pure water) is insufficient and the desired concentration cannot be achieved. In the latter condition, there is the possibility that the concentration of the gas dissolved into the main stream liquid (the pure water or the ultra-pure water) cannot be adjusted at the desired concentration in accordance with the change in the flow rate of the main stream liquid (the pure water or the ultra-pure water). In particular, when a gas having a small solubility such as hydrogen is dissolved into the main stream liquid (the pure water or the ultra-pure water), it is necessary that the main stream liquid (the pure water or the ultra-pure water) be degassed in advance to keep the concentration constant even when the flow rate of the main stream liquid (the pure water or the ultra-pure water) changes. When the main stream liquid (the pure water or the ultra-pure water) is degassed in advance before the gas is dissolved, the signal of the meter measuring the flow rate of the main stream liquid (the pure water or the ultra-pure water) is input to rapidly control the amount of the supplied gas and then the gas in the supplied amount is completely dissolved so that the concentration can be set at the desired value. Even when the flow rate of the main stream liquid (the pure water or the ultra-pure water) changes, the concentration can be recovered rapidly to the desired value due to the above mechanism.

The process for degassing the main stream liquid (the pure water or the ultra-pure water) is not particularly limited. It is preferable that the gas in an amount smaller than the solubility at saturation is supplied after the pure water or the ultra-pure water is treated by a membrane apparatus for degassing comprising a module having a built-in gas-permeating membrane, and thus the capacity to dissolve a gas into water is increased by removing dissolved gases. The dissolution portion for dissolving the gas is not particularly limited. It is preferable that the dissolution portion comprises a module having a built-in gas-permeating membrane. Since the main stream liquid and the supplied gas flowing into the dissolution portion each stagnates at the liquid phase and the gas phase of the dissolution portion for a prescribed period of time, the module exhibits the buffering function offsetting the change in the amount of supply of the gas and a little time lag and thus the functional water having little fluctuation of the concentration of the dissolved gas can be produced with stability. The gas to be dissolved is not particularly limited. Example of the gas includes hydrogen, oxygen, nitrogen, helium, argon, ozone, ammonia and carbon dioxide. With the functional water containing hydrogen, oxygen, helium or argon dissolved into the pure water or the ultra-pure water, fine particles attached to the surface of electronic materials can be removed. With the functional water prepared by dissolving ozone into the pure water or the ultra-pure water, organic substances and metal substrates attached to the surface of electronic materials can be removed. With the functional water prepared by dissolving carbon dioxide into the pure water or the ultra-pure water, build-up of static electricity can be prevented.

In the present invention, the position of the measurement of the flow rate of the main stream liquid is not particularly limited as long as the position is before the dissolution portion where the gas is dissolved. The flow rate of the main stream liquid may be measured before or after the portion for degassing.

In the present invention, when the injection of another liquid into the pure water or the ultra-pure water is conducted in combination with the dissolution of the gas, a portion for injection where the other liquid is injected is disposed at the piping for transporting the main stream liquid. The portion for injection is connected to the tank for the other liquid via a chemical-injection pump. Since the liquid supplied as the other liquid is, in many cases, an aqueous solution, the other liquid is homogeneously mixed with the pure water or the ultra-pure water of the main stream liquid relatively easily. The flow rate of the other liquid can be controlled by the pulse control of the chemical-injection pump. In the same manner as that conducted in the dissolution of the gas, the flow rate of the main stream liquid is measured by a flow meter. The value obtained by the measurement is input into a mechanism for controlling the flow rate built in the chemical-injection pump and the amount of injection of the liquid into the main stream liquid is controlled.

In the present invention, the other liquid dissolved into the main stream liquid is not particularly limited. Examples of the other liquid include aqueous solutions of alkalis such as ammonia, sodium hydroxide, potassium hydroxide and tetramethylammonium hydroxide; aqueous solutions of acids such as hydrochloric acid, sulfuric acid, nitric acid, hydrofluoric acid, phosphoric acid, acetic acid and oxalic acids; and an aqueous solution of hydrogen peroxide. A mixture of these liquids such as a mixed solution of ammonia and an aqueous solution of hydrogen peroxide and a mixed solution of ammonia and hydrofluoric acid can be used.

In the present invention, a combination of the gas and the other liquid may be dissolved into the main stream liquid. The amounts of supply of the gas and the other liquid into the main stream liquid can be controlled in the same manner as that for the single supply of the gas. As the gas and the other liquid to be dissolved in combination, a suitable combination of the gasses and the other liquids exemplified above for single dissolution can be used. For example, when hydrogen and ammonia are dissolved into the ultra-pure water in combination, the effect of the functional water to remove fine particles can be enhanced.

The present invention is very useful since the functional water is automatically produced in accordance with the change in the required amount of water. For example, when the functional water is supplied to four cleaning machines each requiring water in an amount of 5 liters/minute, the required amount of water changes between 0 liter/minute to 20 liters/minute depending on the condition of the cleaning machines (the functional water is used or not used). In a conventional apparatus, the supply of the functional water is continued at the constant condition of 20 liters/minute and the functional water in the excess amount is discharged from the cleaning machines or from the apparatus for producing the functional water. In contrast, in the present invention, the functional water having the constant concentration can be produced in accordance with the required amount of water and the discharge of the excess amount of the functional water can be avoided.

It is also widely conducted that, during the period of time when the functional water is not required temporarily, the flow of the functional water is continued under the ordinary condition so that deterioration in the quality of the functional water remaining in the apparatus due to growth of bacteria is prevented or the limited flow is conducted, i.e., the flow of the pure water or the ultra-pure water alone in a small amount is continued while the supply of the gas and the other liquid is stopped. When the ordinary use of the functional water is resumed after the limited flow, the flow rate of the water is increased and the supply of the gas and the chemical is resumed. At this time, in the conventional process, it takes several minutes to several ten-odd minutes before the prescribed concentration is achieved and the cleaning cannot be conducted during this transition period. In accordance with the present invention, the functional water having the prescribed concentration can be obtained immediately after resuming the cleaning by continuing the supply of the gas and the chemical in an amount in accordance with the flow rate of the water during the limited flow.

As described above, the water containing a dissolved gas in the prescribed concentration (the functional water) which is obtained by the apparatus of the present invention for continuous dissolution of a gas is supplied via pipings to and used at one or more points of use where the water is used as cleaning water and surface treatment water for electronic materials. The functional water may be transferred directly from the apparatus for dissolution to the points of use or may be temporarily stored into a water tank and, thereafter, supplied to the use points via a supply piping of the circulation type formed between the water tank and the points of use. When the functional water is not used or is used in a small amount, the functional water supplied to the points of use is not discharged from the piping as unused water in an excess amount but returns to the water tank via the piping of the circulation type. Since the recycled functional water containing the dissolved gas can be reused with little change in the concentration of the dissolved gas, it is sufficient that the fresh functional water is supplied into the water tank only in the amount of a decrease which is shown by the lowering of the water level from the prescribed position. A meter for measuring the water level is disposed at the water tank and the construction is formed so that the freshly prepared functional water is supplied into the water tank in an amount in accordance with the water level. Since the concentration of the dissolved gas in the functional water produced by the apparatus for continuous dissolution of the present invention can be controlled at the desired value, the concentration of the gas in the functional water to be freshly supplied to the water tank can be adjusted at the same value as the concentration of the dissolved gas in the unused functional water in the water tank (or the piping of circulation). Therefore, the concentration of the added component in the functional water supplied to the points of use can be kept constant and the cleaning of electronic materials can be conducted with stability.

Figure 1:
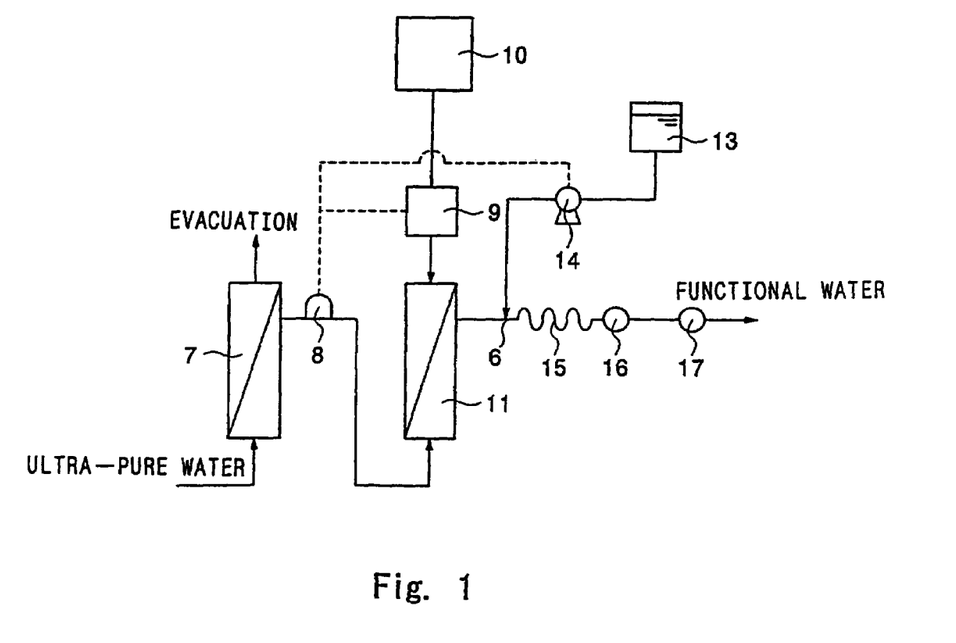
FIG. 1 shows a process flow chart of an embodiment of the apparatus of the present invention.

FIG. 1 shows a process flow chart of an embodiment of the apparatus of the present invention. In this embodiment, a functional water to be used for removing fine particles is produced by dissolving hydrogen and ammonia into the ultra-pure water. Dissolved gases are removed from the ultra-pure water by a membrane apparatus for degassing 7 and, as a result, the capacity to dissolve a gas is expanded for dissolving hydrogen. The flow rate of the degassed ultra-pure water is measured by a flow meter 8 and the signal is sent to a mass flow controller 9 and a chemical-injection pump 14, having the function of controlling the flow rate. The amount of supply of hydrogen gas from a hydrogen source such as a hydrogen gas generator 10 to a membrane module for dissolution of a gas 11 is controlled by the mass flow controller 9 in accordance with the flow rate of the ultra-pure water and then a prescribed amount of hydrogen gas is supplied to and dissolved into the ultra-pure water. In accordance with the flow rate of the ultra-pure water, aqueous ammonia in a prescribed amount is added at an injection portion 6 by the chemical-injection pump 14. The injected aqueous ammonia is homogeneously mixed by an inline mixer 15 and a functional water containing dissolved hydrogen and ammonia is produced. The injection portion 6 may be disposed at a position at the upstream of the membrane module for dissolution of a gas 11 or the membrane apparatus for degassing 7. In this case, the membrane module for dissolution of a gas 11 or the membrane apparatus for degassing 7 may be used as a means for mixing in place of the inline mixer 15. After the concentration of hydrogen dissolved in the functional water is measured by a concentration monitor for dissolved hydrogen 16 and pH is measured by a pH meter 17 or the like, the functional water is transferred to some points of use. The concentration monitor for dissolved hydrogen 16 and the pH meter 17 or the like are used for confirming that the concentration of hydrogen and the pH are set at the desired values.

Figure 2:
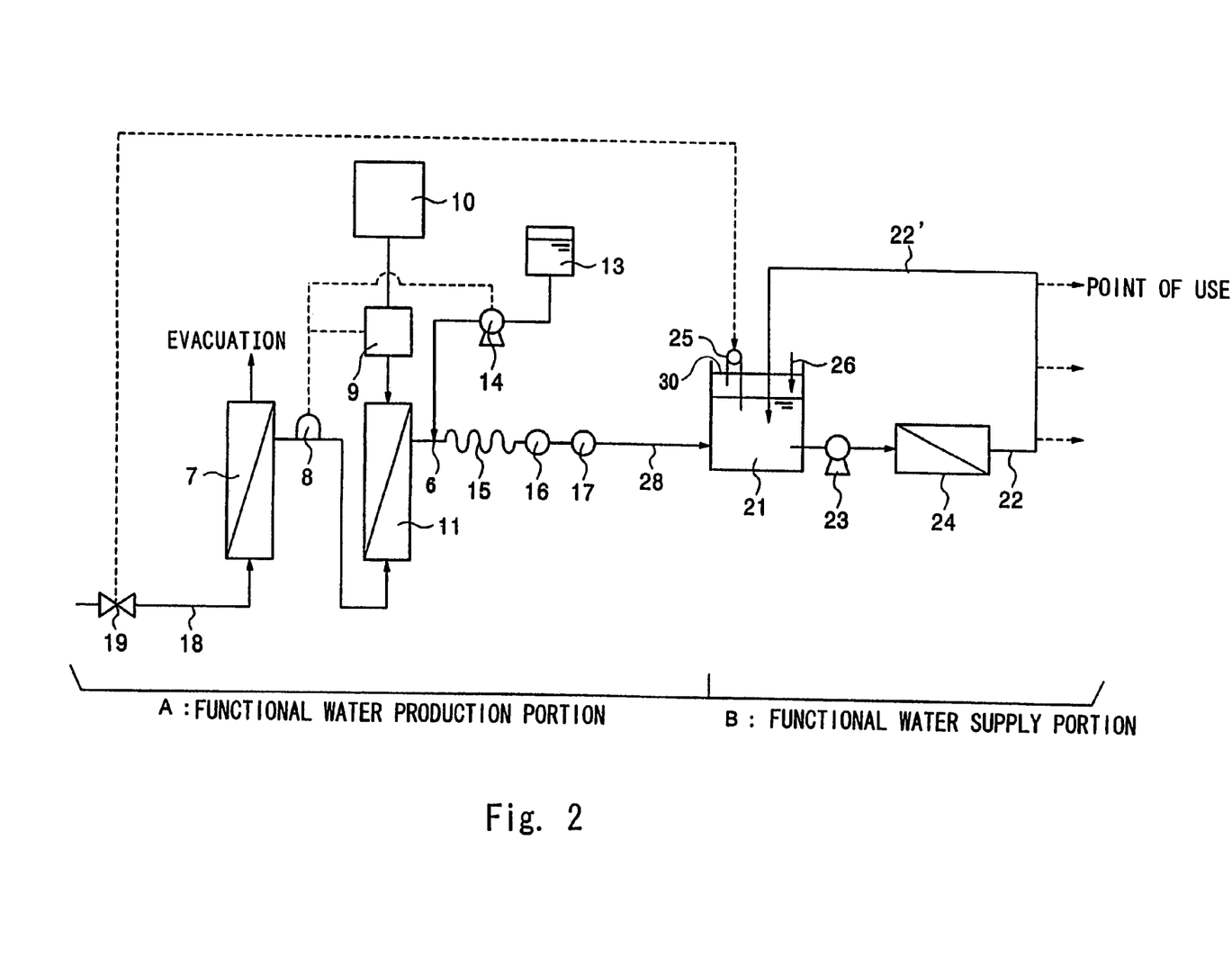
FIG. 2 shows a process flow chart of another embodiment of the apparatus of the present invention for supplying water containing a dissolved gas.

FIG. 2 shows a process flow chart of an embodiment of the apparatus for supplying gas-dissolved water (a functional water) utilizing the apparatus for continuous dissolution of the present invention. The apparatus for supplying gas-dissolved water is comprised of a functional water production portion A for producing a functional water and a functional water supply portion B for supplying a functional water. The functional water production portion A has the same construction as that of the apparatus for dissolution shown in FIG. 1. To a piping for supplying the ultra-pure water 18 to the membrane apparatus for degassing 7, a valve 19 is attached as the means for adjusting the flow rate of water. The flow rate can be adjusted by the valve 19 between zero to the desired flow rate by adjusting the degree of opening of the valve. The valve can control the starting and the stopping of the supply of the ultra-pure water and also the flow rate of the ultra-pure water. As the means for adjusting the flow rate of water, a combination of a valve and a pump may be used in place of the valve.

In the functional water supply portion B, a water tank 21 and a circulating piping system comprising a piping 22 from the water tank 21 towards points of use and a piping 22' returning from the points of use to the water tank 21 are disposed. In the piping 22, a pump 23 is disposed as the driving source for supplying the functional water through the circulating piping system and a filter 24 is disposed at a position at the downstream of the pump. The water tank 21 is tightly closed with a cover 30 so that the water tank is shielded from the atmosphere. To the gas phase portion of the water tank, a pipe for supplying a sealing gas 26 is connected so that the inside of the water tank can be sealed and a portion for discharging a gas is formed so that the pressure inside the water tank can be kept constant although this is not shown in the Figure. As the gas used for the sealing, the same gas as that contained in the gas-dissolved water or an inert gas such as nitrogen can be used. In the former case, when a plurality of gases are dissolved into the pure water or the ultra-pure water, the change in the concentrations of the dissolved gases in the water tank can be suppressed by using a mixed gas having a composition such that the pressure of each component gas is the same as the partial pressures of the corresponding dissolved component gas. Therefore, it is desirable that a mixed gas is used. To the water tank, a piping for supplying gas-dissolved water 28 through which the functional water obtained in the functional water production portion A is supplied is connected. To the water tank 21, a water level meter 25 is disposed. The signal from the water level meter is transferred to a valve 19 of the functional water production portion A and the valve is opened, closed or used by adjustment of the degree of opening. It is preferable that the volume of the gas phase portion within the water tank 21 is as small as possible so that the change in the concentration in the gas-dissolved water is suppressed. For this purpose, it is preferable that the water level meter 25 can detect the surface of the gas-dissolved water at a position close to the lower face of the cover 30. By keeping the volume of the gas phase portion small, the partial pressure of the gas dissolved into the aqueous phase and the partial pressure of the gas in the gas phase portion can be brought into the equilibrium in a short time and the change in the concentration is kept small.

In the apparatus for supplying gas-dissolved water shown in FIG. 2, the functional water in the water tank 21 is transferred from the piping 22 to some points of use by the pump 23 and the functional water in an excess amount and not used at the points of use returns to the water tank 21 via the piping 22' and circulated through the circulating piping system. Since there is the possibility that fine particles are formed from sliding portions of the pump 23 during the circulation and contained in the functional water, the fine particles are removed when the functional water passes through the filter 24. As the filter 24, membrane filters such as a micro filter or an ultra filter are suitable. When the functional water is consumed at the points of use, the water level in the water tank 21 is lowered. When the water level reaches the lower limit, the signal of the water level meter is transferred to the valve 19. The supply of the ultra-pure water to the functional water production portion A starts and the flow rate of the supplied water is controlled by adjusting the degree of opening of the valve. In the functional water production portion A, as shown in the descriptions for FIG. 1, the flow rate of the supplied ultra-pure water is measured by the flow meter 8 and the gas (for example, hydrogen) to be dissolved into the ultra-pure water is supplied to the membrane module for dissolution of a gas 11 under control of the flow rate in accordance with the value obtained by the measurement. Thus, the functional water having the same concentration as that of the gas dissolved in the functional water in the water tank is produced. In the same manner, the prescribed amount of the chemical (for example, aqueous ammonia) in accordance with the flow rate of the ultra-pure water is added to the functional water. The produced functional water is transferred to the water tank 21, temporarily stored in the water tank together with the unused functional water in the excess amount and delivered for use at the points of use via the circulation water system. When the freshly produced functional water is supplied to the water tank and the water level of the water tank reaches the upper limit, the valve 19 is closed by the signal of the water level meter. The supply of the ultra-pure water is stopped and the function of gas dissolution in the functional water producing portion A is temporarily stopped. Alternatively, even when the water level 25 detects the upper limit, the gas-dissolved water in a small amount may be continuously passed so that the cleanliness of the functional water production portion A is maintained. In this case, a mechanism for overflow which is not shown in the Figure is disposed at the water tank 21 and the excess amount of the gas-dissolved water is discharged from the water tank 21 so that the amount of the stored gas-dissolved water does not exceed the capacity of the water tank 21. Since the concentration of the dissolved gas in the produced functional water can be adjusted at the desired value even when the flow rate of the ultra-pure water changes, the concentration of the dissolved gas can be kept at the same value as that of the unused functional water in either case where the water level in the water tank is recovered rapidly or slowly to the upper limit and, as a result, the functional water having a constant concentration can be supplied to the points of use. Therefore, when the apparatus of the present invention for supplying gas-dissolved water is used, the functional water in an excess amount at the points of use can be collected to the water tank and reused in combination with the freshly supplied functional water. In conventional processes, since it is difficult that the functional water having a constant concentration is obtained when the flow rate of the supplied water changes and it is also difficult that the concentration of the freshly supplied functional water is adjusted at the same value as that of the functional water in the excess amount, the functional water in the excess amount is discharged to the outside or collected as the ultra-pure water after the functional water in the excess amount is treated by degassing. In contrast, the present invention enables remarkably more efficient recycling.

It is desirable that the water level in the water tank is kept at a high position even when the used amount of water changes since the relative amounts of the gases in the gas phase and the liquid phase are stabilized and the change in the concentration of the gas in the water can be suppressed. It is preferable that the gas phase at the upper portion of the water tank is sealed with a sealing gas and the relative amounts of the gases in the gas phase are kept constant.

It is preferable that a heat exchanger is disposed at a suitable position in the circulating piping system such as a position between the pump 23 and the filter 24 so that the elevation of the temperature of the water due to the heat of the pump can be suppressed and the temperature of the functional water can be kept constant.

EXAMPLES

The present invention will be described more specifically with reference to examples in the following. However, the present invention is not limited to the examples.

Example 1

Hydrogen-dissolved water was produced by using the apparatus for producing a functional cleaning water shown in FIG. 1. The used ultra-pure water contained 10 to 18 ppm of dissolved nitrogen gas and 0.01 to 2 ppm of dissolved oxygen gas. The ultra-pure water was passed through a membrane apparatus for degassing and degassed until the concentration of the dissolved nitrogen gas was 1.5 ppm or smaller and the concentration of the dissolved oxygen gas was 0.5 ppm or smaller. The degassed ultra-pure water was supplied to the dissolution portion. The signal of the flow rate of the ultra-pure water was output from the Karman's vortex flow meter and the amount of supply of hydrogen gas was controlled proportionally to the flow rate of the ultra-pure water by the mass flow controller. Hydrogen was dissolved into the ultra-pure water at the dissolution portion having a module having a built-in gas-permeating membrane and hydrogen-dissolved water was produced.

The production of the hydrogen-dissolved water started under the condition of a flow rate of the ultra-pure water of 20 liters/minute and an amount of supply of hydrogen of 260 ml/minute. After the start of the production, the flow rate of the ultra-pure water was changed to 10 liters/minute after 30 minutes, 15 liters/minute after 60 minutes, 20 liters/minute after 80 minutes, 25 liters/minute after 110 minutes, 20 liters/minute after 120 minutes, 2 liters/minute after 150 minutes and 20 liters/minute after 180 minutes. The production of the hydrogen-dissolved water was conducted for the total time of 200 minutes.

The flow rate of the ultra-pure water, the amount of supply of hydrogen and the concentration of hydrogen in the hydrogen-dissolved water which were obtained by the measurements are shown in Table 1.

TABLE 1

| Time (min) | Flow rate of ultra-pure water (liter/min) | Amount of supply of hydrogen (ml/min) | Concn. of dissolved hydrogen (mg/min) | Note |
| --- | --- | --- | --- | --- |
| 1 | 19.45 | 251 | 0.08 | |
| 5 | 19.73 | 256 | 0.80 | |
| 10 | 19.24 | 257 | 1.01 | |
| 14 | 19.64 | 257 | 1.11 | |
| 17 | 19.59 | 257 | 1.12 | |
| 20 | 19.75 | 256 | 1.15 | |
| 25 | 19.53 | 256 | 1.12 | |
| 30 | 10.87 | 135 | 1.11 | flow rate of ultra-pure water was changed |
| 35 | 10.64 | 132 | 1.12 | |
| 40 | 10.97 | 136 | 1.11 | |
| 50 | 10.78 | 138 | 1.12 | |

TABLE 1-continued

| Time (min) | Flow rate of ultra-pure water (liter/min) | Amount of supply of hydrogen (ml/min) | Concn. of dissolved hydrogen (mg/min) | Note |
| --- | --- | --- | --- | --- |
| 60 | 15.18 | 192 | 1.12 | flow rate of ultra-pure water was changed |
| 65 | 15.27 | 200 | 1.10 | |
| 70 | 15.35 | 201 | 1.15 | |
| 80 | 19.65 | 258 | 1.15 | flow rate of ultra-pure water was changed |
| 90 | 19.88 | 256 | 1.10 | |
| 100 | 19.66 | 256 | 1.15 | |
| 110 | 24.21 | 323 | 1.14 | flow rate of ultra-pure water was changed |
| 113 | 24.08 | 325 | 1.15 | |
| 117 | 24.35 | 327 | 1.15 | |
| 120 | 19.98 | 260 | 1.14 | flow rate of ultra-pure water was changed |
| 130 | 19.72 | 257 | 1.13 | |
| 140 | 19.83 | 258 | 1.12 | |
| 150 | 2.05 | 26 | 1.14 | flow rate of ultra-pure water was changed |
| 160 | 2.04 | 26 | 1.15 | |
| 170 | 2.10 | 26 | 1.13 | |
| 180 | 19.94 | 259 | 1.11 | flow rate of ultra-pure water was changed |
| 182 | 20.09 | 258 | 1.11 | |
| 185 | 20.10 | 260 | 1.13 | |
| 190 | 20.00 | 259 | 1.14 | |
| 200 | 19.97 | 257 | 1.13 | |

As shown in Table 1, when the production of the hydrogen-dissolved water was started under the condition of the flow rate of the ultra-pure water of about 20 liters/minute, the concentration of the dissolved hydrogen exceeded 1.00 mg/liter after 10 minutes and reached 1.11 mg/liter after 14 minutes and the condition which can be used as the functional water for cleaning electronic members could be achieved. After the start of the production, the amount of the supply of hydrogen was automatically controlled in response to the changes in the flow rate of the ultra-pure water after 30, 60, 80, 110, 120, 150 and 180 minutes and the concentration of hydrogen in the produced hydrogen-dissolved water was always kept stable within the range of 1.10 to 1.15 mg/liter.

By using the apparatus and the process of the present invention, the formation of hydrogen-dissolved water in a low concentration was prevented after the start of the production and the hydrogen-dissolved water always having the prescribed concentration of the dissolved hydrogen could be produced. Even when the flow rate of the ultra-pure water changed, the amount of supply of hydrogen was controlled proportionally to the change in the amount of the ultra-pure water and therefore, the hydrogen-dissolved water always having the prescribed concentration of the dissolved hydrogen could be produced.

INDUSTRIAL APPLICABILITY

In accordance with the apparatus for continuous dissolution and the process for continuous dissolution of the present invention, the solution having a constant concentration of a gas can be obtained with stability even when the flow rate of the main stream liquid changes. In particular, cleaning water or surface treatment water used for electronic materials which particularly requires a precisely clean surface can be supplied without loss and the cleaning treatment or the surface treatment can be conducted with excellent reproducibility. When a small flow rate set for saving water is increased to a flow rate in the ordinary condition, the concentration of the gas dissolved into functional water is always kept constant, the time lag for stabilization is eliminated and the loss in water can be prevented.

Using the apparatus for supplying gas-dissolved water, unused functional water in an excess amount can be collected and reused.

What is claimed is:

1. An apparatus for supplying water containing a dissolved gas which comprises:
   (a) an apparatus for producing water containing a dissolved gas comprising:
   (i) a degassing apparatus,
   (ii) an apparatus for dissolving a gas disposed at a position downstream of the degassing apparatus which comprises a flowmeter for measuring a flowrate of degassed pure water or ultra-pure water and outputting a signal of a value obtained by the resultant measurement, said flowmeter being disposed at a position between the degassing apparatus and said apparatus for dissolving a gas,
   (iii) a mechanism for controlling a flowrate which controls an amount of a gas to be dissolved into the pure water or the ultra-pure water based on an input signal from the flowmeter and
   (iv) a means for adjusting an amount of water which adjusts an amount of the pure water or the ultra-pure water supplied to the apparatus for dissolving a gas; and
   (b) an apparatus for supplying the water containing a dissolved gas comprising:
   (i) a water tank which receives the water containing a dissolved gas in an excessive amount which is not used at a point of use,
   (ii) a piping system through which the water containing a dissolved gas flows from the water tank towards the point of use and the water containing a dissolved gas in an excessive amount returns to the water tank,
   (iii) a piping system for supplying the water containing a dissolved gas which supplies the water containing a dissolved gas obtained in the apparatus for producing the water containing a dissolved gas to the water tank; and
   (iv) a controlling means for adjusting an amount of water based on a water level in the water tank.

2. The apparatus according to claim 1, wherein the water tank comprises a gas chase portion and is tightly closed by a cover to shield the tank from the atmosphere, and is sealed by a sealing gas.

3. The apparatus according to claim 2, which further comprises a device for supplying the sealing gas, wherein the sealing gas is the same gas as the gas dissolved in the water containing a dissolved gas.

4. The apparatus according to claim 1, wherein the apparatus for dissolving a gas comprises a module having a built-in gas-permeating membrane.

5. The apparatus according to claim 1, wherein the degassing apparatus comprises a module having a built-in gas-permeating membrane.

6. The apparatus according to claim 1, wherein the flowmeter is a Karman's vortex flowmeter or an ultrasonic flowmeter.

7. The apparatus according to claim 1, wherein the amount of supply of a gas is controlled in accordance with a proportional control or a PID control.

8. The apparatus according to claim 1, wherein the amount of supply of a gas is controlled in accordance with a PID control.

9. The apparatus according to claim 3, wherein the apparatus for dissolving a gas comprises a module having a built-in gas-permeating membrane.

10. The apparatus according to claim 9, wherein the flowmeter is a Karman's vortex flowmeter or an ultrasonic flowmeter.

11. The apparatus according to claim 10, wherein the amount of supply of a gas is controlled in accordance with a PID control.

12. The apparatus according to claim 1 which further comprises a means for injecting an other liquid into the water containing a dissolved gas and an amount of injection of said other liquid is controlled based on the input signal of the flowmeter for measuring a flowrate of the pure water or the ultra-pure water.

13. The apparatus according to claim 11 which further comprises a means for injecting an other liquid into the water containing a dissolved gas and an amount of injection of said other liquid is controlled based on the input signal of the flowmeter for measuring a flowrate of the pure water or the ultra-pure water.

14. The apparatus according to claim 1, wherein the dissolved gas is a gas selected from the group consisting of hydrogen, oxygen, nitrogen, helium, argon, ozone, ammonia, carbon dioxide and a mixture of said gases.

15. The apparatus according to claim 11, wherein the dissolved gas is a gas selected from the group consisting of hydrogen, oxygen, nitrogen, helium, argon, ozone, ammonia, carbon dioxide and a mixture of said gases.

16. The apparatus according to claim 13, wherein the dissolved gas is a gas selected from the group consisting of hydrogen, oxygen, nitrogen, helium, argon, ozone, ammonia, carbon dioxide and a mixture of said gases.

17. The apparatus according to claim 12, wherein the other liquid injected into the water containing a dissolved gas is a liquid selected from the group consisting of an aqueous solution of ammonia, an aqueous solution of sodium hydroxide, an aqueous solution of potassium hydroxide, an aqueous solution of a tetramethylammonium hydroxide, an aqueous solution of hydrochloric acid, an aqueous solution of sulfuric acid, an aqueous solution of nitric acid, an aqueous solution of hydrofluoric acid, an aqueous solution of phosphoric acid, an aqueous solution of acetic acid, an aqueous solution of oxalic acid, an aqueous solution of hydrogen peroxide, a mixed solution of ammonia and an aqueous solution of hydrogen peroxide, and a mixed solution of ammonia and hydrofluoric acid.

18. The apparatus according to claim 16, wherein the other liquid injected into the water containing a dissolved gas is a liquid selected from the group consisting of an aqueous solution of ammonia, an aqueous solution of sodium hydroxide, an aqueous solution of potassium hydroxide, an aqueous solution of a tetramethylammonium hydroxide, an aqueous solution of hydrochloric acid, an aqueous solution of sulfuric acid, an aqueous solution of nitric acid, an aqueous solution of hydrofluoric acid, an aqueous solution of phosphoric acid, an aqueous solution of acetic acid, an aqueous solution of oxalic acid, an aqueous solution of hydrogen peroxide, a mixed solution of ammonia and an aqueous solution of hydrogen peroxide, and a mixed solution of ammonia and hydrofluoric acid.

* * * * *